United States Patent
Mei et al.

(10) Patent No.: US 7,065,188 B1
(45) Date of Patent: Jun. 20, 2006

(54) SYSTEM AND METHOD FOR PERSONALIZING DIALOGUE MENU FOR AN INTERACTIVE VOICE RESPONSE SYSTEM

(75) Inventors: Gee-Gwo Mei, Yorktown Heights, NY (US); Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/421,363

(22) Filed: Oct. 19, 1999

(51) Int. Cl.
    *H04M 1/64* (2006.01)
(52) U.S. Cl. ...................... 379/88.23; 379/76
(58) Field of Classification Search ............. 379/88.25, 379/88.23, 88.17, 88.16, 71, 93.12, 67.1, 379/76
See application file for complete search history.

(56) References Cited

U.S. PATENT DOCUMENTS

| | | | | |
|---|---|---|---|---|
| 5,724,406 A | * | 3/1998 | Juster | 379/88.13 |
| 5,737,393 A | * | 4/1998 | Wolf | 379/88.13 |
| 5,802,526 A | | 9/1998 | Fawcett et al. | |
| 5,864,605 A | * | 1/1999 | Keshav | 379/88.01 |
| 5,933,484 A | * | 8/1999 | Partridge, III | 379/201.01 |
| 5,970,124 A | * | 10/1999 | Csaszar et al. | 379/88.18 |
| 6,016,336 A | * | 1/2000 | Hanson | 379/88.23 |
| 6,061,433 A | * | 5/2000 | Polcyn et al. | 379/93.12 |
| 6,173,042 B1 | * | 1/2001 | Wu | 379/88.04 |
| 6,487,277 B1 | * | 11/2002 | Beyda et al. | 379/88.01 |

* cited by examiner

*Primary Examiner*—Fan Tsang
*Assistant Examiner*—Olisa Anwah
(74) *Attorney, Agent, or Firm*—McGinn IP Law Group, PLLC; Stephen C. Kaufman, Esq.

(57) ABSTRACT

A method and system for personalizing an interactive voice response (IVR) system to reduce a number of key sequences to reach a desired source of information, includes storing a caller profile, and retrieving the caller's profile to construct a personalized IVR dialogue menu and play out the personalized menu.

41 Claims, 4 Drawing Sheets

SYSTEM AND METHOD FOR PERSONALIZING DIALOGUE MENU FOR AN INTERACTIVE VOICE RESPONSE SYSTEM

FIELD OF THE INVENTION

The present invention is generally related to an interactive voice response (IVR) system and method, and more particularly to a system and method for personalizing a dialogue menu for an interactive voice response system.

BACKGROUND OF THE INVENTION

Interactive voice response (IVR) systems have been widely used by many organizations to provide computerized customer support services, such as account access and technical support for products and services (e.g., retail, financial, administrative, etc.). When a support center with an IVR system is contacted by a caller, the caller is typically presented with voice information. The IVR system poses voice queries to the caller, typically in a menu-driven fashion. Then, the caller inputs responses via a touch-tone (e.g., dual-tone multifrequency (DTMF)) telephone to the voice queries from the IVR system. In most cases, the caller is then presented with additional voice queries based on the responses received.

As alluded to above, the IVR system typically presents a caller with voice queries based on some standard hierarchical dialogue menu (e.g., a decision tree). General queries are presented first at the top level, and then, based on the caller's responses, more specific queries are presented at lower levels to narrow the caller's requests. At the lowest level in the IVR system menu, namely the "leaf" level in a decision tree, the caller is finally presented with the most specific voice information available. It is this more specific information that the caller must navigate through sequentially and which the caller is usually most interested in.

Thus, there are several problems with such a standard menu presentation for an IVR system. Firstly, every caller typically must listen to the same standard menu and place a different sequence of phone keys on the telephone set to navigate the IVR system. These static-type menu-based approaches are very time-consuming. Such menu-driven systems are normally too general for a specific caller to obtain his/her desired information (and certainly not in a timely manner).

Moreover, in some cases such as using portable cellular telephones, the caller must actuate many telephone keys to indicate his desires and confirm the same. Such small portable phones typically must be lifted from the user's ear and then must depress the telephone key(s) and so forth to move through each of the options presented by the menu. This is highly inconvenient.

Secondly, with the ever more complex services being provided via an IVR system, it is becoming more difficult to successfully navigate an IVR system menu. Usually, it is only after a long sequence of pushing the buttons that the caller finally obtains the desired information or services. If mistakes were made during the button-pushing process, a caller normally is lost. This represents a major inconvenience to the user, and potentially a lost opportunity (customer) to the retailer, etc. Sometimes the user does not even know how to go back to the main menu. It is not uncommon for a caller to make many phone calls to get to the desired information or obtain the needed services. Consequently, the frustrated caller becomes an unhappy customer.

Thirdly, even if a caller is successful in navigating the complex menu, it is still inconvenient to go through the same long sequence again and again every time the caller accesses the same information. For example, a caller calls an 800 number to check the caller's bank account for a certain deposit check. The caller may have to make many calls during a period of several days. This caller must listen and go through the same menu(s) having a long sequence of buttons and commands repeatedly.

In one conventional system, a system and method are disclosed for graphically displaying and navigating through an interactive voice response menu. The emphasis is on displaying the IVR menu graphically on a computer screen to let a caller navigate the menu graphically. However, such a system does not present a personalized menu for a caller.

Furthermore, such a system does not keep track of caller's access patterns, nor does the system present another set of personalized menus for a caller based on the caller's prior access patterns.

SUMMARY OF THE INVENTION

In view of the foregoing and other problems, disadvantages, and drawbacks of the conventional systems and method, an object of the present invention is to provide a system and method for providing a personalizable dialogue menu for an IVR system such that each customer can specify the customer's own interests.

Another object of the present invention is to provide such a personalizable IVR system which keeps track of a caller's previously accessed patterns and provides a shortcut thereto.

In a first aspect of the present invention, a method of personalizing an IVR system to reduce the number of key sequences to reach desired source of information, includes storing a caller profile, and retrieving the caller's profile to construct a personalized IVR dialogue menu and play out the personalized menu.

In a second aspect, a system is provided for implementing the above method.

Further, in a third aspect, a signal-bearing medium is provided for storing the method of the present invention.

In accordance with the illustrated embodiment of the present invention, the above-mentioned problems associated with an IVR system using a standard hierarchical menu are solved.

That is, in a first, non-limiting embodiment of the present invention, once a caller is identified by the IVR system, the caller is presented with a personalized voice menu so that the caller can go to the desired destination via shortcuts provided by the IVR system. The personalized voice menu can be specified by the caller via the touch-tone telephone or via a browser and the World Wide Web (WWW). After receiving callers' specifications, a list of shortcuts to the desired destinations are provided in the personalized dialogue menu.

In another non-limiting embodiment of the present invention, the IVR system also tracks the caller's access patterns. A set of personalized menu are presented to a caller based on the caller's past access patterns.

A caller to such a personalized IVR system can access the desired information from the menu more quickly and efficiently according to the caller's personal interests. Besides the default standard system menu, the caller is also presented with a list of personalized shortcuts to go to the caller's desired destinations without the typical lengthy and time-consuming interactions with the IVR system.

DETAILED DESCRIPTION OF THE PREFERRED EMBODIMENTS OF THE PRESENT INVENTION

Turning now to the FIGS. 1–9, hereinbelow preferred embodiments of the present invention will be described.

Figure 1:
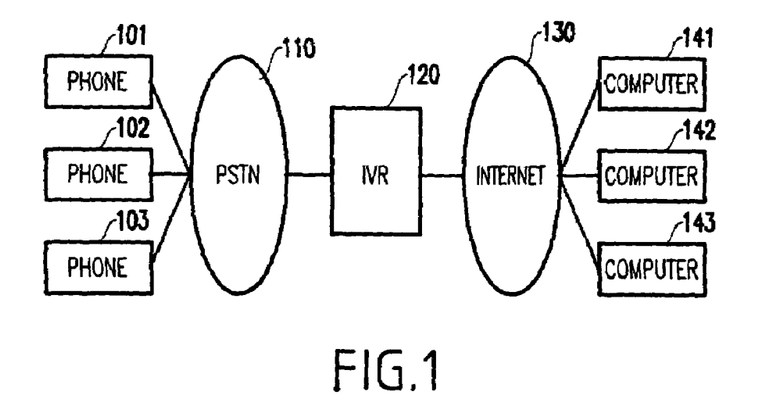
FIG. 1 is a block diagram of a network system according to a first preferred embodiment of the present invention.

FIG. 1 is a block diagram of a network system that supports touch-tone phones to access an IVR system 120 via the public switched telephone network (PSTN), in accordance with an exemplary embodiment of the present invention. Customers preferably use touch-tone phones 101, 102, 103 to access the IVR system 120 via the PSTN 110 by dialing the telephone number of the IVR system. It is noted that any touch-tone phones can be used, includes wired and wireless phones.

The IVR system 120 preferably includes a computer system that typically has PSTN cards, a central processing unit (CPU), memory, storage, networking devices, text-to-speech (TTS) synthesizers, DTMF detection systems and voice recognition systems.

The IVR system 120 stores a dialogue menu that it uses to interact with the telephone users through the telephone keypads or voice inputs. According to an exemplary embodiment of the present invention, the IVR system 120 also stores customer profiles containing personalized dialogue menus which can be specified by the users or suggested by the IVR system based on the user's previous access patterns.

Finally, the IVR system 120 may also have an IP (Internet Protocol) connection to a data network, such as the Internet 130, an intranet (not shown), a personal area network (PAN) (not shown), and the like, through which the dialogue menu can be customized by the user with a browser running on a computer 141, 142, 143.

Figure 2:
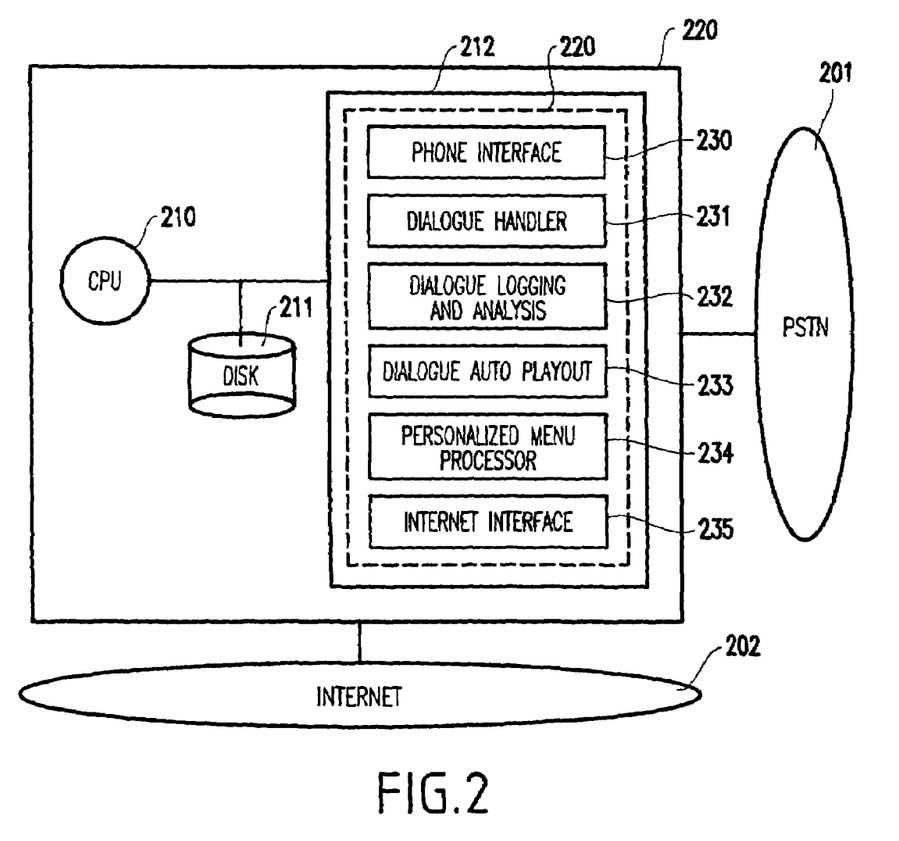
FIG. 2 is a block diagram of an IVR system that supports personalizable dialogue menu according to an exemplary embodiment of the present invention.

FIG. 2 is a block diagram of an IVR system 200 that supports a personalizable dialogue menu in accordance with an exemplary embodiment of the present invention.

As shown in FIG. 2, the IVR system 200 preferably includes a computer system including a CPU 210, a fixed or removable storage device (e.g., hereafter referred to as a "disk", for convenience, but obviously not limited thereto) 211 and a dynamic random access memory 212. The IVR system 200 preferably is connected to both the PSTN 201 and the Internet 202. User profiles, as well as their personalized dialogue menus, are stored on disk 211 and can be fetched into the dynamic random access memory 212 for processing by the CPU 210. The software program logic 220 for the IVR system 200 is also stored on disk 211 as executable code and can be loaded into the memory 212 as needed to perform the IVR functions.

The major functional modules of the IVR system that support a personalizable dialogue menu include a phone interface module 230, a dialogue handler module 231, a dialogue logging and analysis module 232, a dialogue auto (automatic) playout module 233, a personalized menu processor module 234, and an Internet interface module 235.

The phone interface module 230 is responsible for receiving DTMF tones or voice inputs from the users via the PSTN 201, and for transmitting synthesized or stored voice messages to the users also via the PSTN 201. The configuration of a personalized menu can be performed by a user through the PSTN 201 via this telephone interface module 230.

The Internet interface module 235 is the interface to the Internet 202, and communicates with other systems via the Internet 202 to retrieve information necessary for the IVR system to playback via the phone interface 230. For example, module 235 can use various message protocols, such as pop3, sendmail, HTTP, SHTTP, NNTP and FTP, and the like, to retrieve messages from the Internet. It can also present a configurable menu to the IVR users via the Web for the users to specify their personalized IVR dialogue menus. The personalized menu specification as well as other messages received from the Internet are generally in text format. The Internet interface module 235 thus must parse these text messages into a certain format so that the IVR system can use them to interact with the users through the phone interface module 230.

The dialogue handler module 231 contains a finite state machine (FSM) that models the state transitions of an IVR system. That is, the FSM is triggered by key sequences. Preferably, some defaults are built-in to the FSM. For example, a default may include if the system is waiting for a key input but none is received within a predetermined amount of time, then a default action is triggered by the system.

The outputs of the dialogue handler module 231 determine the messages that go back to the phone users. The inputs of dialogue handler module 231 are derived from user inputs either via DTMF or voice messages from the phone users. The FSM is constructed based on the dialogue menu such as that described below with regard to FIG. 3. Basically, the FSM takes an input from the phone user and makes a state transition. Each state is corresponding to a node in the directed graph represented by the dialogue menu.

The dialogue logging and analysis module 232 records the dialogues between the IVR system and the phone users (e.g., automatically). It logs the input sequences from each phone user of the IVR system while he/she conducts dialogues with the IVR system. The information collected can be used to analyze each user's access patterns.

The analyzed access patterns, such as the latest dialogue paths or the most frequently traversed dialogue paths, can then be used to provide shortcuts for personalized access to the frequently accessed information for the phone users. The IVR system can provide such personalized direct access automatically when a phone user next calls the IVR system. Alternatively, the IVR system can suggest such access patterns to the users for creating personalized menus.

The dialogue auto playout module 233 facilitates the personalized access of information by the users. If a user decides to use his/her personalized shortcuts, the control sequences representing the shortcuts will be fed into the dialogue auto playout module 233.

However, the intermediate output messages from the IVR system will not go back to the user during the auto playout. It is only the final output message from the auto playout session that will go back to the phone users. Those skilled in the art will appreciate that it is possible to facilitate the direct access of personalized information by other means. For example, a pointer to the desired information can be used to enable the dialogue auto playout module to directly play-out the message once a user chooses to use the shortcut.

The personalized menu processor module 234 constructs shortcuts for the personalized menus specified by the users. The specification can be performed either via phone interactions or via the Web. Once specified by the user, the personalized menu can be represented by a list of direct dialogue paths to the desired information or a simplified hierarchical dialogue menu.

Figure 3:
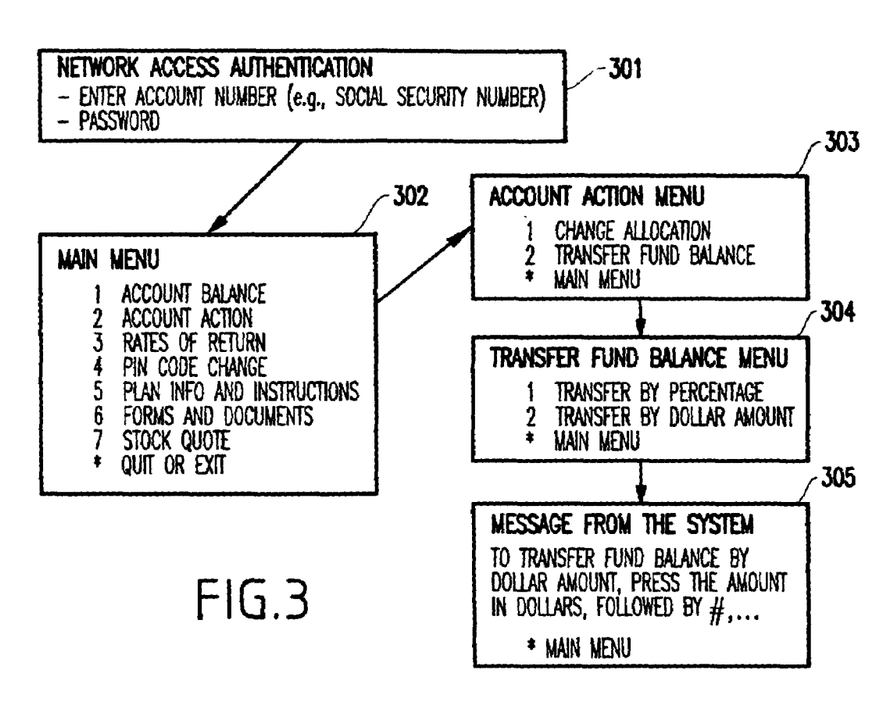
FIG. 3 is a block diagram of a conventional IVR dialogue menu.

FIG. 3 is a block diagram describing a conventional IVR dialogue menu. Before a user can navigate the conventional system menu, the user must dial a phone number. Then, there is typically a network access authentication 301. During the network access authentication, the user is typically asked to enter through the phone keypad the user account number and password (personal identification number (PIN) etc. After authentication, a main menu 302 will be presented.

In the main menu 302, a list of options will be announced, such as "for account balance, please press 1; for account action, please press 2; for rate of return, please press 3;" . . . , and so on. If a user presses 2 on a touch-tone phone from the main menu 302, then the IVR system will announce the account action menu 303. In the account action menu, another list of options will then be announced by the IVR system to the user. If the user presses 2 again, then the user must listen to another list of options 304. Finally, if the user presses 2 again, then the user must listen to the message of transferring fund balance by dollar amount 305.

One major drawback of the above-described IVR dialogue menu is that a user cannot change the flow of the IVR operations. Namely, a user cannot change the design of the dialogue menu. It is not possible to program one's own personalized dialogue menu where shortcuts can be provided for more efficient navigation of the dialogue menu. Each user must listen to the same hierarchical dialogue menu step-by-step (e.g., sequentially) in order to reach the desired information source.

For example, if a user is just interested in transferring the user's fund balance by dollar amount, the user must press a sequence of keys (e.g., three keys such as pressing 2 followed by 2 followed by another 2). For this simple IVR application, the user must wait for the IVR to repeat the voice messages on the menu before it reaches what the user desires. This is usually time-consuming and error-prone, especially if the IVR dialogue menu is a complex and deep hierarchical menu. The user of a complicated IVR system can easily be lost.

Figure 4:
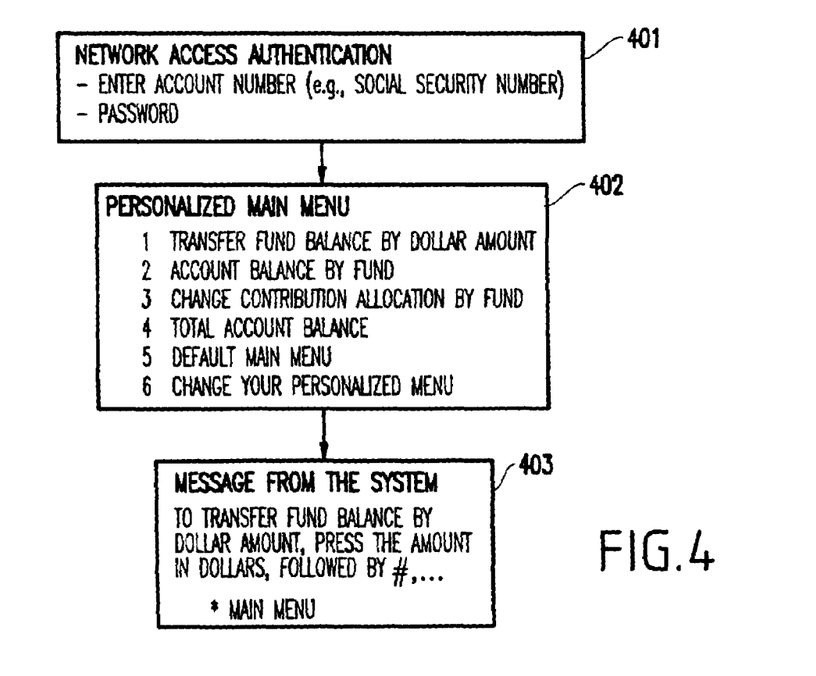
FIG. 4 illustrates a personalized IVR menu according to a first preferred embodiment of the present invention.

FIG. 4 shows a personalized IVR menu in accordance with an exemplary embodiment of the present invention. Here, the IVR main menu 402 contains a list of personalized shortcut paths in addition to the default main menu. The option for changing one's personalized menu is also provided in the main menu. There can be two kinds of shortcuts. One is user-defined and the other is system-analyzed.

User-defined shortcuts are defined by the user via the phone or via the Web. For example, option 1 in the main menu 402 represents a shortcut for a key sequence (2, 2, 2) from the default menu in FIG. 3. System-analyzed shortcuts are derived from a user's previously traversed paths. A user can ask the system to provide the most frequently traversed dialogue paths or the most recently traversed dialogue paths or others. The system may provide the most frequently traversed dialogue paths on its own transparent to the user.

In FIG. 4, after network access authentication 401, the personalized main menu 402 is presented to the phone user. If a user simply presses 1 in 402, the user will be listening to the message about transferring fund balance by dollar amount 403. In contrast, in the conventional system and method shown in FIG. 3, a user must press three consecutive 2s in order to reach this information. The default main menu, the account action menu, and the transfer fund balance menu are all skipped in FIG. 4.

Those skilled in the art will appreciate that, before a user sets up his/her own personalized main menu, the IVR system can provide a list of default shortcuts in the main menu. When a user dials into the IVR system for the first time, he/she can choose to change the personalized menu. On the other hand, the IVR system may simply provide the option of setting up your own personalized shortcuts for the first-time users in the main menu without a list of default shortcuts.

Figure 5:
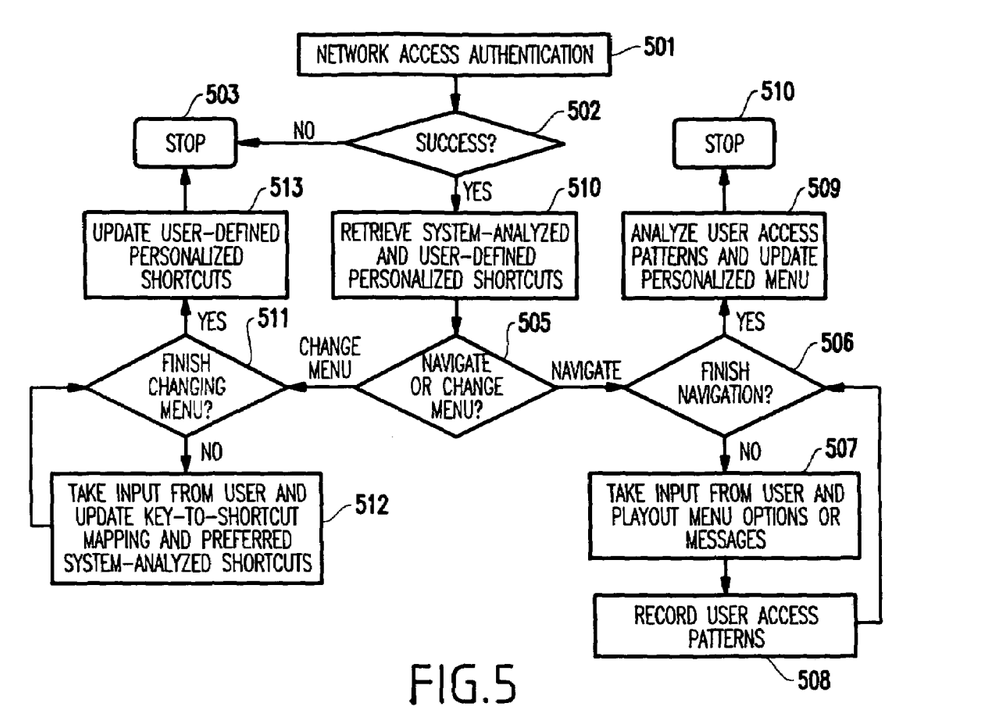
FIG. 5 is a flow diagram of the operation of an IVR system supporting the personalizable dialogue menu according to the present invention.

FIG. 5 shows the flow diagram of the operations of an IVR system that supports a personalizable dialogue menu in accordance with an exemplary embodiment of the present invention.

A user first dials a phone number to the IVR system and passes through the authentication (step 501). If the user is authenticated (e.g., "YES" in step 502), then the IVR system retrieves the user's profile, including system-analyzed and user-defined personalized shortcuts, to construct the personalized main menu (e.g., step 504). The personalized main menu (see block 402 in FIG. 4) typically contains a list of personalized shortcuts, a default main menu, and the option to change the personalized menu. It is noted that the user can select to turn off (e.g., deactivate) the personalizable menu for whatever reason. Such a deactivation would be performed just prior to step 504.

Depending on the inputs by the user, either via keypad or voice, there are basically two options (e.g., one of which is selected in step 505). A first option is to navigate the IVR system and the other option is to change the personalized menu.

For navigation (e.g., steps 506 and beyond), if it is a shortcut, then the dialogue auto playout module 233 is invoked to provide the direct messages to the user. If it is a traversal of the default menu, then the dialogue handler module 231 is used to provide interactions with the user.

In both cases, the IVR system checks to see if the navigation is finished (step 506). If not, it takes the input from the user and plays out either the menu options or messages (step 507). For every user action, in step 508 the access patterns are recorded by the dialogue logging and analysis module 232.

After navigation is completed (e.g., "YES" in step 506), the recorded user access patterns are analyzed (step 509). These access patterns are then used to update the user's personalized menu, if necessary. For example, a user may ask the IVR system to provide a shortcut to the most frequently accessed dialogue path in the user's personalized main menu. After the personalized menu is updated, the system stops (step 510).

For changing the menu (e.g., steps 511 and beyond), the IVR system provides a dialogue to take a user's specifications via, for example, the phone (step 512). Basically, a user defines a "key binding" for a shortcut. The shortcut can be represented by the key sequence to reach a desired information source. For example, in FIG. 4, key 1 is bound to the shortcut represented by the key sequence (2, 2, 2). The key-to-shortcut mapping can also be obtained via the Web.

In step 512, the user can also change the preferred system-analyzed shortcuts. A user can specify which type of system-analzyed shortcuts.

For example, a user can make shortcuts to one or more (e.g., the two (2) most frequently traversed) dialogue paths, or one or more of the previous traversed paths (e.g., the last three (3) most recently traversed paths). After finishing changing the menu, the changes are updated (step 513) and the system stops (step 503).

Those skilled in the art will appreciate that there are other approaches to the design of the personalized menu within the purview of the present application.

Figure 6:
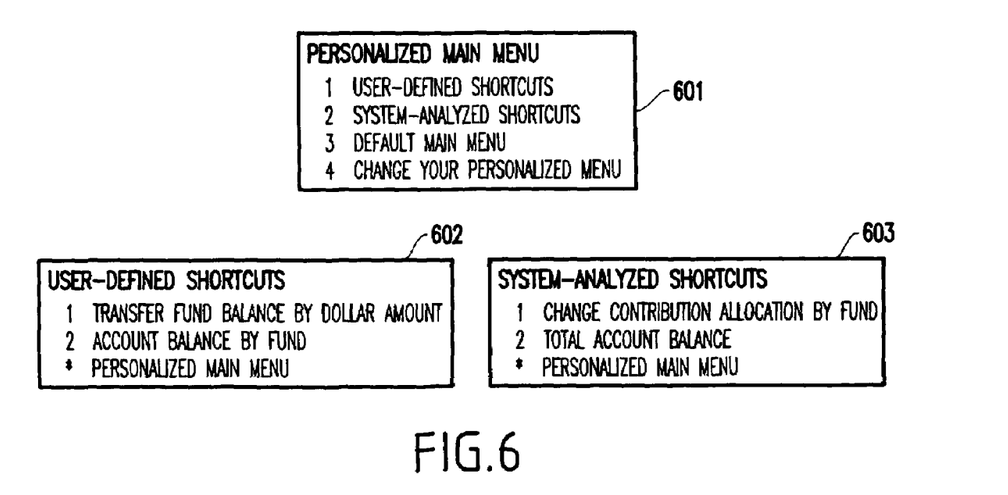
FIG. 6 illustrates another exemplary personalized dialogue menu for an IVR system.

FIG. 6 is another example of a personalized dialogue menu for an IVR system. Instead of defining a list of shortcuts, a simplified hierarchical tree menu may be provided, especially if a user desires many information destinations in the default dialogue menu.

For example, one can define a personalized main menu 601 that contains a sub-menu of user-defined shortcuts and another sub-menu of system-analyzed shortcuts. With a user pressing a key on the phone, the IVR system then leads to the appropriate sub-menu. In block 602, the user-defined shortcuts are then listed. In block 603, the system-analyzed shortcuts are listed. Even within 602 and 603, another simplified hierarchical menu can also be designed by the user.

Those skilled in the art will also appreciate that a simplified tree can also be derived directly from the default menu by a tree-collapsing method. This tree-collapsing method essentially prunes: (1) branches leading to leaf nodes that are not chosen; and (2) unnecessary intermediate nodes from a chosen node to the nearest common ancestor node of another chosen node.

Figure 7:
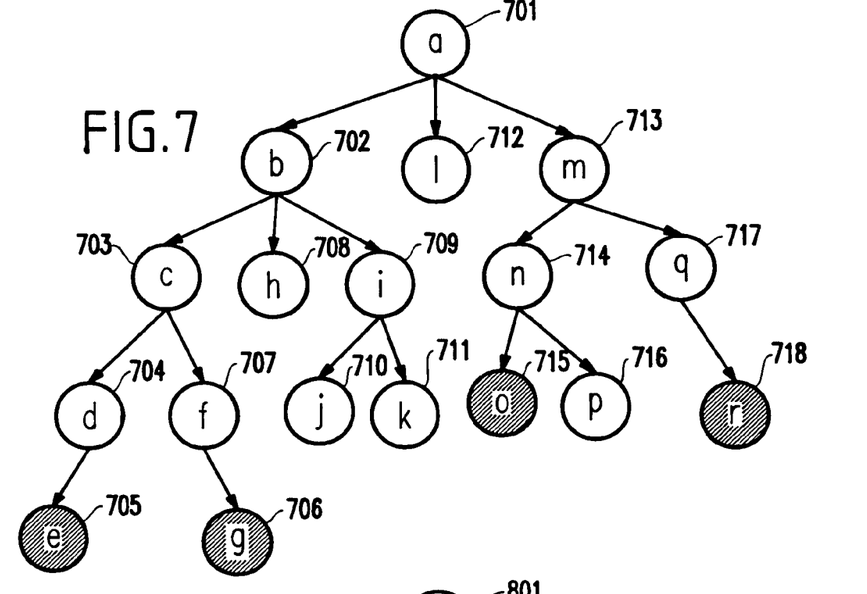
FIG. 7 illustrates a standard menu with a node 701 as a main menu.
Figures 8, 9:
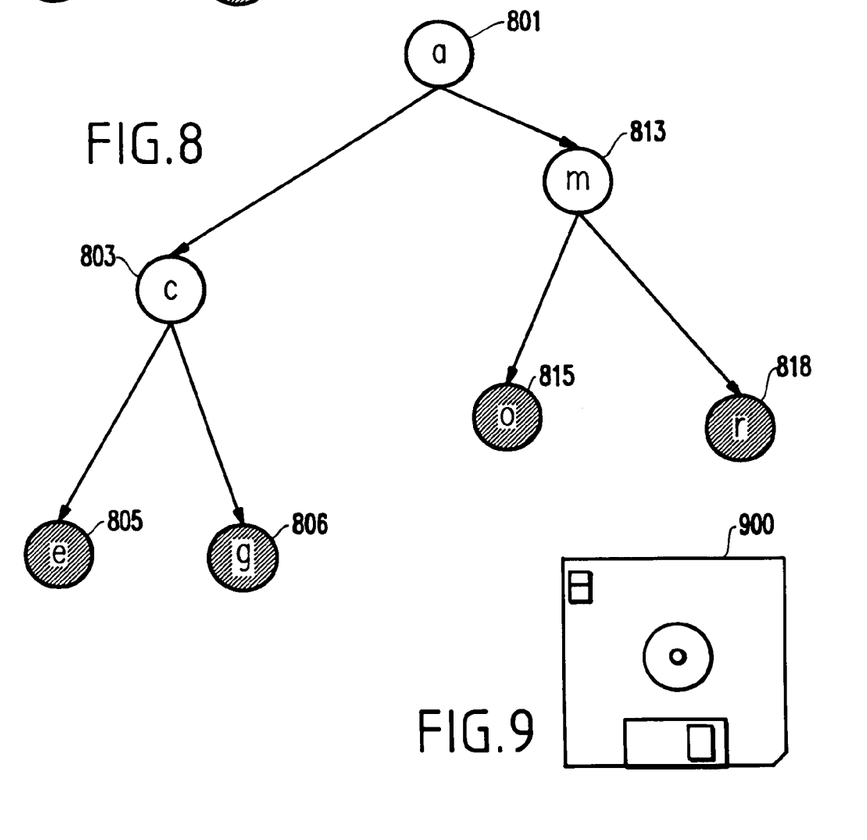
FIG. 8 illustrates a resulting simplified personalized menu from that shown in FIG. 7.
FIG. 9 illustrates a storage medium for storing steps of the program for eliminating visible artifacts in overlapped projections.

FIGS. 7 and 8 are examples of a tree-collapsing method to construct a simplified personalized menu from a standard menu.

FIG. 7 shows a standard menu with node a (701) as the main menu. FIG. 7 also shows that nodes e, g, o, and r (705, 706, 715, and 718) have been chosen by a user to be the preferred information sources.

Accordingly, using the above-described tree-collapsing scheme in which pruning branches leading to leaf nodes that are not chosen, is performed, the branches leading to leaf nodes h, j, k, l, and p (708, 710, 711, 712, and 716) will be pruned. The intermediate nodes d, f, n, and q (704, 707, 714, and 717) will also be pruned. Such nodes are pruned since they are not needed to provide a menu choice.

However, nodes c and m (703 and 713) will be kept because they are the nearest common ancestors of different chosen leaf nodes. Node b (702) will be pruned since it is not a nearest common ancestor of any two chosen leaf nodes. Node a 701 will also be kept since it is the nearest common ancestor of nodes c and m (703 713), and these two nodes are preserved because they are the nearest common ancestors of different chosen leaf nodes.

FIG. 8 is the resultant simplified personalized menu from FIG. 7. It starts with node a (801) and then has two branches to nodes c and m (803 and 813). From node c (803), there are two branches to the chosen nodes e and g (805 and 806). From node m (813), there are two branches to the chosen nodes o and r (815 and 818).

Furthermore, in another aspect of the invention, those skilled in the art will appreciate that, with dialogue logging and analysis, it becomes possible to implement targeted advertisement insertion based on a "collaborative filtering" approach.

Basically, collaborative filtering categorizes all the users into one or more clusters based on a set of shown interests or purchased items. Within a cluster, the users share certain common characteristics, such as they all express interest in a certain book. However, each user may also have other unique characteristics.

For example, user A has read Books N, O, and P and user B has read Books O, P and L. Users A and B are in the same cluster based on the books that both have read. Book N represents a unique characteristic of user A while Book L represents another unique characteristic of user B. These unique characteristics can be used as a basis for cross-promotion to users within a cluster. For example, Book N can be cross-promoted to user B (e.g., based on User A's reading of the book) while Book L can be cross-promoted to user A (e.g., based on User B's reading of the Book L).

Thus, the users of an IVR system can be categorized into various clusters/bins according to their past accessing patterns. Each member of the cluster share a common attribute. The member(s) of the cluster may have purchased a unique item (in the case above a book) and other people in the cluster may be interested in such an item (e.g., unique to the purchaser) by virtue of their being in the same cluster as the purchaser.

Thus, from the users within a cluster, the contents accessed by the users can be used to create targeted advertisement messages (e.g., in a banking environment, these advertisements could be for promoting new financial services of the bank). Such advertisements could also include a third-party's goods/advertisements. These advertisement messages can be inserted into the personalized menus and played out during the interactions with the IVR system (e.g., any place but preferably an area which is least intrusive to the user).

As shown in FIG. 9, in addition to the hardware and process environment described above, a different aspect of the invention includes a computer-implemented method for personalizing an IVR system to reduce the number of key sequences to reach a desired source of information, as described above. As an example, this method may be implemented in the particular hardware environment discussed above.

Such a method may be implemented, for example, by operating the central processing unit (CPU) 210 included in the structure shown in FIG. 2, to execute a sequence of machine-readable instructions. These instructions may reside in various types of signal-bearing media, including disk 211.

Thus, this aspect of the present invention is directed to a programmed product, comprising signal-bearing media tangibly embodying a program of machine-readable instructions executable by a digital data processor incorporating the CPU and hardware above, to perform the method of personalizing an IVR system, as described above.

This signal-bearing media may include, for example, a RAM (not shown) contained within the CPU 210, as represented by the fast-access storage for example. Alternatively, the instructions may be contained in another signal-bearing media, such as a magnetic data storage diskette 900 (FIG. 9), directly or indirectly accessible by the CPU 210.

Whether contained in the diskette 900, disk 211, the CPU 210, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a preferred embodiment, those skilled in the art will recognize that the invention can be practiced with modification within the spirit and scope of the appended claims.

What is claimed is:

1. A method for personalizing an interactive voice response (IVR) system to reduce a number of key sequences to reach a desired source of information, comprising:
   storing a caller profile;
   accessing said IVR system via a telephone;
   retrieving the caller profile to construct a personalized IVR dialogue menu and play out the personalized IVR dialogue menu via said telephone, said personalized IVR dialogue menu comprising:
      a plurality of shortcut paths including an option for changing said plurality of shortcut paths in said personalized IVR dialogue menu; and
   performing a tree-based collapsing of said personalized IVR dialogue menu,
   wherein said personalized IVR dialogue menu is at least one of based on a caller access pattern and configurable by said caller.

2. The method of claim 1, further comprising:
   tracking an access pattern of said caller.

3. The method of claim 1, further comprising:
   specifying, by said caller, a content of said personalized IVR dialogue menu.

4. The method of claim 1, further comprising:
   providing a tracking of IVR accessing patterns of said caller such that one of said plurality of shortcut paths is provided to a desired location based on said caller's IVR accessing patterns.

5. The method of claim 4, wherein said one of said plurality of shortcut paths is based on a most-recently accessed IVR pattern.

6. The method of claim 4, wherein said one of said plurality of shortcut paths is based on a most-frequently accessed IVR pattern.

7. The method of claim 3, wherein a specification of said personalized IVR menu is performed over a telephone.

8. The method of claim 3, wherein a specification of said personalized IVR menu is performed over a network.

9. The method according to claim 8, wherein said network comprises at least one of a World-Wide-Web (WWW), an intranet, and a personal area network (PAN).

10. The method of claim 1, further comprising:
    displaying to said caller said IVR menu to reduce a number of key sequences during interactions.

11. The method of claim 1, further comprising:
    inserting a personalized sub-menu into said personalized IVR dialogue menu.

12. The method of claim 1, further comprising:
    inserting an advertisement into said caller's personalized IVR dialogue menu, based on the caller's IVR past accessing patterns, during said caller's navigation of said personalized IVR dialogue menu.

13. The method according to claim 12, wherein said inserting of said advertisement is based on contents of said menu that the caller has accessed.

14. The method according to claim 1, wherein said retrieving is performed upon said system receiving a telephone call from said caller.

15. A system for personalizing an interactive voice response (IVR) system to reduce a number of key sequences to reach a desired source of information, comprising:
    a storage device for storing a caller profile;
    a telephone for accessing said IVR system; and
    a retrieval unit for:
       retrieving the caller profile to construct a personalized IVR dialogue menu and play-out the personalized IVR dialogue menu via said telephone, said personalized IVR dialogue menu comprising:
          a plurality of shortcut paths including an option for changing said plurality of shortcut paths in said personalized IVR dialogue menu; and
       performing a tree-based collapsing of said personalized IVR dialogue menu,
    wherein said personalized IVR dialogue menu is at least one of based on a caller access pattern and configurable by said caller.

16. The system according to claim 15, wherein said retrieval unit retrieves said caller profile upon said system receiving a telephone call from said caller.

17. The system according to claim 15, wherein said retrieval unit is selectively interfaced with a network and a public switch telephone network (PSTN).

18. The system according to claim 17, wherein said retrieval unit includes:
    a telephone interface module for selectively interfacing with said PSTN and for selectively receiving a predetermined tone and a voice input from said caller via the PSTN,
    wherein said telephone interface module selectively transmits at least one of synthesized and stored voice messages to said caller via the PSTN,
    wherein said personalized IVR dialogue menu is configurable by said caller through the PSTN via said telephone interface module.

19. The system according to claim 15, wherein said retrieval unit further includes:
    a dialogue handler, coupled to receive an input from said caller, for modeling state transitions of said system, to provide an output,
    wherein the output of said dialogue handler module determines a message to be returned to said caller, and an input of said dialogue handler module is derived from a caller input via at least one of a predetermined tone and a voice message form said caller.

20. The system according to claim 15, wherein said retrieval unit further includes:
    a dialogue logging and analysis module for recording a dialogue between the IVR system and said caller, and logging input sequences from said caller of the IVR system while said caller conducts said dialogue with said IVR system,
    wherein said input sequences logged are for analyzing said caller's access patterns.

21. The system according to claim 20, wherein the analyzed access patterns are for providing a shortcut for personalized access to at least one of a most-frequently accessed information of said caller and a most-recently accessed dialogue path of said caller.

22. The system according to claim 21, wherein, based on said input sequences logged, said dialogue logging and analysis module provides at least one of personalized direct access automatically when said caller next calls the IVR system and a suggestion of such access pattern to said caller for creating said personalized menu.

23. The system according to claim 15, wherein said retrieval unit further includes:
   a dialogue automatic playout module for allowing personalized access of information by said caller,
   wherein if said caller decides to use a personalized shortcut path unique to said caller, control sequences representing said shortcut path are input to said dialogue automatic playout module.

24. The system according to claim 15, wherein said retrieval unit further includes:
   a personalized menu processor module for constructing said shortcut for the personalized menus specified by said caller,
   wherein specification is selectively performed over one of a telephone interaction and a world-wide network, and
   wherein a personalized menu specified by said caller is represented by one of a list of direct dialogue paths to desired information and a hierarchical dialogue menu.

25. A system for personalizing an interactive voice response (IVR) system to reduce a number of key sequences to reach a desired source of information, comprising:
   a storage for storing a caller profile; and
   a retrieval unit for:
      retrieving the caller's profile to construct a personalized IVR dialogue menu and play-out the personalized menu, said retrieval unit being selectively interfaced with a network and a public switch telephone network (PSTN), and said personalized IVR dialogue menu comprising:
         a plurality of shortcut paths including an option for changing said plurality of shortcut paths in said personalized IVR dialogue menu; and
         performing a tree-based collapsing of said personalized IVR dialogue menu,
   wherein said retrieval unit includes:
      a telephone interface module for selectively interfacing with said PSTN and for selectively receiving a predetermined tone and a voice input from said caller via the PSTN, said telephone interface module selectively transmitting at least one of synthesized and stored voice messages to said caller via the PSTN,
   wherein said personalized IVR dialogue menu is configurable by said caller through the PSTN via said telephone interface module,
   wherein said retrieval unit further includes:
      a network interface module for communicating with external systems via the network to retrieve information for the IVR system to playback via said telephone interface module,
   wherein said network interface module presents a configurable menu to the caller via the network for the caller to specify the caller's personalized dialogue menu, and
   wherein the network interface module parses text messages into a predetermined format such that the parsed text messages are used to interact with the caller through said telephone interface module.

26. The system according to claim 17, wherein said network includes at least one of the Internet, an intranet, and a personal area network.

27. A signal-bearing medium tangibly embodying a program of machine-readable instructions executable by a digital processing apparatus to perform a method for personalizing an interactive voice response (IVR) system to reduce a number of key sequences to reach a desired source of information, said method comprising:
   storing a caller profile;
   accessing said IVR system via a telephone;
   retrieving the caller profile to construct a personalized IVR dialogue menu and play out the personalized IVR dialogue menu via said telephone, said personalized IVR dialogue menu comprising:
      a plurality of shortcut paths including an option for changing said plurality of shortcut paths in said personalized IVR dialogue menu; and
      performing a tree-based collapsing of said personalized IVR dialogue menu,
   wherein said personalized IVR dialogue menu is at least one of based on a caller access pattern and configurable by said caller.

28. The method of claim 1, wherein said personalized menu is constructed based on said caller's defined parameter other than a most recent selection made by said caller.

29. The method of claim 1, wherein said personalized menu is constructed automatically by said system based on available user profile information not limited to said caller's most recently accessed menu selection.

30. The system of claim 15, further comprising:
   means for constructing said personalized menu based on said caller's defined parameter other than a most recent selection made by said caller.

31. The system of claim 15, wherein said personalized menu is constructed automatically by said system based on available caller profile information not limited to said caller's most recently accessed menu selection.

32. The method of claim 1, wherein said option for changing said plurality of shortcuts in said personalized IVR dialogue menu, comprises an option for changing said personalized menu to include a selected shortcut.

33. The method of claim 1, wherein said option for changing said plurality of shortcut paths in said personalized IVR dialogue menu comprises an option for selecting a sequence of direct dialogue paths to be included in said personalized IVR dialogue menu.

34. The method of claim 1, wherein said option for changing said plurality of shortcut paths in said personalized IVR dialogue menu comprises an option for changing said personalized IVR dialogue menu before navigating said personalized IVR dialogue menu during a current call.

35. The method of claim 1, wherein said plurality of shortcut paths comprises system-analyzed shortcuts which are based on a caller access pattern, and user-defined shortcuts which are specified by said caller.

36. The method of claim 35, wherein said personalized IVR dialogue menu further comprises an option for selecting a default main menu.

37. The method of claim 1, further comprising:
   inserting an advertisement into said caller's personalized IVR dialogue menu, based on the caller's IVR past accessing patterns, during said caller's navigation of said personalized IVR dialogue menu,
   wherein said option for changing said plurality of shortcuts in said personalized IVR dialogue menu comprises an option for changing said personalized IVR dialogue menu to include a selected shortcut, and
   wherein a specification of said personalized IVR dialogue menu is performed over a network comprising at least one of a World-Wide-Web (WWW), an intranet, and a personal area network (PAN).

38. The method of claim 3, wherein said specifying said content of said personalized IVR dialogue menu comprises at least one of adding a shortcut path to and deleting a shortcut path from said personalized IVR dialogue menu.

39. The method of claim 1, wherein said option for changing said plurality of shortcut paths in said personalized IVR dialogue menu comprises an option for at least one of adding a shortcut path to and deleting a shortcut path from said personalized IVR dialogue menu.

40. The method of claim 1, wherein upon electing said option for changing said plurality of shortcut paths, said system provides a dialogue for allowing said caller to use said telephone to input user-defined shortcuts via key sequences based on key-to-shortcut mapping.

41. The method of claim 1, wherein said receiving said caller profile comprises playing out said personalized IVR dialogue menu upon said system receiving a telephone call from said user.

* * * * *